United States Patent
Yamada et al.

(10) Patent No.: US 12,443,745 B2
(45) Date of Patent: Oct. 14, 2025

(54) INFORMATION PROCESSING APPARATUS AND INFORMATION PROCESSING METHOD

(71) Applicant: SONY GROUP CORPORATION, Tokyo (JP)

(72) Inventors: Chie Yamada, Tokyo (JP); Noriko Totsuka, Tokyo (JP); Hiroaki Ogawa, Tokyo (JP); Yasuharu Asano, Tokyo (JP); Akira Takahashi, Tokyo (JP); Chika Myoga, Tokyo (JP); Masanobu Nakamura, Tokyo (JP); Kana Nishikawa, Tokyo (JP); Masahiro Yamamoto, Tokyo (JP); Michael Hentschel, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 404 days.

(21) Appl. No.: 17/922,725

(22) PCT Filed: Mar. 25, 2021

(86) PCT No.: PCT/JP2021/012640
§ 371 (c)(1),
(2) Date: Nov. 1, 2022

(87) PCT Pub. No.: WO2021/235086
PCT Pub. Date: Nov. 25, 2021

(65) Prior Publication Data
US 2023/0252183 A1  Aug. 10, 2023

(30) Foreign Application Priority Data
May 18, 2020 (JP) .................. 2020-087001

(51) Int. Cl.
*G06F 21/62* (2013.01)
*G06F 40/20* (2020.01)
(Continued)

(52) U.S. Cl.
CPC .......... *G06F 21/6245* (2013.01); *G06F 40/20* (2020.01); *G06T 11/00* (2013.01);
(Continued)

(58) Field of Classification Search
None
See application file for complete search history.

(56) References Cited

U.S. PATENT DOCUMENTS

2015/0081713 A1* 3/2015 Alonso .................. H04L 67/10
707/738
2018/0046708 A1* 2/2018 Stewart ................ G06V 10/762
(Continued)

FOREIGN PATENT DOCUMENTS

| JP | 2011-029831 A | 2/2011 |
| JP | 2013-196107 A | 9/2013 |
| WO | 2013/031096 A1 | 3/2013 |

OTHER PUBLICATIONS

Jijlings, et al., "Selective Search for Object Recognition", International Journal of Computer Vision 104.2, Apr. 2, 2013, pp. 154-171.
(Continued)

*Primary Examiner* — Jennifer Mehmood
*Assistant Examiner* — Promotto Tajrian Islam
(74) *Attorney, Agent, or Firm* — CHIP LAW GROUP

(57) ABSTRACT

Provided is an information processing apparatus that includes a region estimating unit estimate candidate regions of object detection from an image, a topic estimating unit that estimates a topic of the image on the basis of text information accompanying the image, a region evaluating unit that evaluates the candidate regions estimated by the
(Continued)

region estimating unit on the basis of relationships with the topic estimated by the topic estimating unit, and an image generating unit that generates an image on the basis of evaluation results acquired by the region evaluating unit. The topic estimating unit described above estimates the topic on the basis of words to which tags are added.

15 Claims, 11 Drawing Sheets

(51) Int. Cl.
  *G06T 11/00* (2006.01)
  *G06V 10/25* (2022.01)
  *G06V 10/74* (2022.01)
  *G06V 10/75* (2022.01)
  *G06V 10/774* (2022.01)
  *G06V 40/16* (2022.01)
(52) U.S. Cl.
  CPC ............ *G06V 10/25* (2022.01); *G06V 10/759* (2022.01); *G06V 10/761* (2022.01); *G06V 10/774* (2022.01); *G06V 40/172* (2022.01); *G06V 2201/10* (2022.01)

(56) References Cited

U.S. PATENT DOCUMENTS

2019/0278800 A1* 9/2019 Fulton .................... G06T 7/70
2020/0257922 A1* 8/2020 Huang ................ G06V 30/224
2021/0110811 A1* 4/2021 Joseph .................. G10L 13/10

OTHER PUBLICATIONS

Oquab, et al., "Is object localization for free?—Weakly-supervised learning with convolutional neural networks", IEEE, Conference on Computer Vision and Pattern Recognition, Jun. 2015, 10 pages.
International Search Report and Written Opinion of PCT Application No. PCT/JP2021/012640, issued on Jun. 22, 2021, 08 pages of ISRWO.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/012640 filed on Mar. 25, 2021, which claims priority benefit of Japanese Patent Application No. JP 2020-087001 filed in the Japan Patent Office on May 18, 2020. Each of the above-referenced applications is hereby incorporated herein by reference in its entirety.

TECHNICAL FIELD

A technology disclosed in this specification (hereinafter referred to as "present disclosure") relates to an information processing apparatus, an information processing method, and a computer program performing a predetermined process on an image.

BACKGROUND ART

At present, social networking services (SNSs) are widely used, and it has become common for users to upload photographs and moving images they have captured using information terminals such as smartphones to an SNS site. An image or a moving image is convenient as a simple way of conveying much information and a realistic sensation, but it comes with the risk of unintentional leakage of personal information. In order to protect privacy and security, many users perform processing of hiding portions from which places can be identified and portions in which other persons' faces are shown with stickers or by applying mosaic processing and then post a corresponding image or moving image.

Although there are many applications supporting such processing, basically, an operation of designating a processing method for finding and hiding a part to be hidden by a user and the like needs to be performed. Performing such a manual operation is a labor for a user, and there is concern that a user may overlook or forget to erase personal information may occur.

For example, an image processing system performing a blindfolding process for protecting privacy for faces included in image data has been proposed (see PTL 1). However, although portrait rights can be protected by blindfolding a face, when a background (for example, an image of the vicinity of a house, belongings, and the like) is shown as it is, various kinds of personal information such as an imaging location, an address, and the like can be gathered, and thus there is concern that privacy and security may be threatened.

In addition, an image processing apparatus calculating a degree of importance of each segment of a foreground, a background, and the like on the basis of a degree of importance of each of objects such as persons and the like shown in an image and performing close trimming for cutting out regions of objects having high degrees of importance and a foreground, and drawn trimming for cutting out regions of objects having high degrees of importance, a foreground, and a background has been proposed (see PTL 2). However, in a case in which trimming is performed by calculating degrees of importance of objects only from image information, it cannot be determined that trimming reflects details that a user desires to post to an SNS site. For example, it is assumed that a segment that a user desires to post is eliminated or an unnecessary segment is shown.

CITATION LIST

Patent Literature

[PTL 1]
JP 2013-196107 A
[PTL 2]
WO 2013/031096

Non Patent Literature

[NPL 1]
Uijlings, Jasper R R, et al. "Selective search for object recognition." International journal of computer vision 104.2 (2013): 154-171.
[NPL 2]
Oquab, Maxime, et al. "Is object localization for free?—weakly-supervised learning with convolutional neural networks." Proceedings of the IEEE Conference on Computer Vision and Pattern Recognition. 2015.

SUMMARY

Technical Problem

An object of the present disclosure is to provide an information processing apparatus, an information processing method, and a computer program performing a process for protecting privacy and security on an image uploaded to an SNS site.

Solution to Problem

The present disclosure is in consideration of the problems described above, and, according to a first aspect thereof, there is provided an information processing apparatus including: a region estimating unit configured to estimate candidate regions of object detection from an image; a topic estimating unit configured to estimate a topic of the image on the basis of text information accompanying the image; a region evaluating unit configured to evaluate the candidate regions estimated by the region estimating unit on the basis of relationships with the topic estimated by the topic estimating unit; and an image generating unit configured to generate an image on the basis of evaluation results acquired by the region evaluating unit.

The region estimating unit described above estimates the candidate regions using an algorithm for grouping regions that are similar on a pixel level and extracting regions.

The topic estimating unit described above estimates the topic on the basis of words with high degrees of importance included in the text information. For example, the topic estimating unit described above estimates the topic on the basis of words to which tags are added.

The region evaluating unit described above determines a candidate region having a strong relationship with the topic to be a region of interest. The region evaluating unit described above determines a candidate region in which an object relating to the topic is detected to be a region of interest and determines the other candidate regions to be regions of non-interest using an object detector relating to the topic. In addition, in a case in which the object detector relating to the topic is not prepared in advance, the region evaluating unit described above collects an image group having tag information relating to the topic and performs detection of objects using an object detector that has performed learning using the image group.

According to a second aspect of the present disclosure, there is provided an information processing method including: a region estimating step of estimating candidate regions of object detection from an image; a topic estimating step of estimating a topic of the image on the basis of text information accompanying the image; a region evaluating step of evaluating the candidate regions estimated in the region estimating step on the basis of relationships with the topic estimated in the topic estimating step; and an image generating step of generating an image on the basis of evaluation results acquired in the region evaluating step.

In addition, according to a third aspect of the present disclosure, there is provided a computer program described in a computer-readable form causing a computer to function as: a region estimating unit configured to estimate candidate regions of object detection from an image; a topic estimating unit configured to estimate a topic of the image on the basis of text information accompanying the image; a region evaluating unit configured to evaluate the candidate regions estimated by the region estimating unit on the basis of relationships with the topic estimated by the topic estimating unit; and an image generating unit configured to generate an image on the basis of evaluation results acquired by the region evaluating unit.

The computer program according to the third aspect of the present disclosure defines a computer program described in a computer-readable form for realizing a predetermined process on a computer. In other words, by installing the computer program according to the third aspect of the present disclosure on a computer, cooperative operations are performed on the computer, and operations and effects similar to those of the information processing apparatus according to the first aspect of the present disclosure can be acquired.

In addition, according to a fourth aspect of the present disclosure, there is provided an information processing apparatus including: an image input unit configured to receive an image; a text information input unit configured to receive text information accompanying the image; an object detecting unit configured to detect objects included in the image; a subject estimating unit configured to estimate a subject of the image on the basis of the image and the text information; and an image processing unit configured to perform image processing on each object detected by the object detecting unit on the basis of the subject estimated by the subject estimating unit.

The image processing unit described above performs image processing on each object in accordance with a degree of relation of each object detected by the object detecting unit with the subject. For example, by performing image processing of deleting or blurring an object having no degree of relation or a low degree of relation with the subject from the input image, privacy is protected.

In addition, according to a fifth aspect of the present disclosure, there is provided an information processing method including: an image input step of receiving an image; a text information input step of receiving text information accompanying the image; an object detecting step of detecting objects included in the image; a subject estimating step of estimating a subject of the image on the basis of the image and the text information; and an image processing step of performing image processing on each object detected by the object detecting object on the basis of the subject estimated by the subject estimating unit.

In addition, according to a sixth aspect of the present disclosure, there is provided a computer program described in a computer-readable form causing a computer to function as: an image input unit configured to receive an image; a text information input unit configured to receive text information accompanying the image; an object detecting unit configured to detect objects included in the image; a subject estimating unit configured to estimate a subject of the image on the basis of the image and the text information; and an image processing unit configured to perform image processing on each object detected by the object detecting object on the basis of the subject estimated by the subject estimating unit.

Advantageous Effects of Invention

According to the present disclosure, an information processing apparatus, an information processing method, and a computer program performing a process for protecting privacy and security without deviating from a topic on an image uploaded to an SNS site can be provided.

Note that the effects described in the present specification are merely examples, and the effects provided by the present disclosure are not limited thereto. In addition to the above effects, the present disclosure may have additional effects.

Other objects, features, and advantages of the present disclosure will become clear according to detailed description based on embodiments which will be described later and the attached drawings.

DESCRIPTION OF EMBODIMENTS

Hereinafter, the present disclosure will be described in the following order with reference to the drawings.

A. Overview
B. Apparatus configuration
C. Functional configuration
D. Processing procedure for generating posting image
E. Specific example
F. Modification example G. Application examples
H. Effects

A. OVERVIEW

The present disclosure relates to performing image processing for protecting privacy and security mainly on an image that is a photograph, a moving image, or the like to be posted by a user to an SNS site.

At present, various kinds of SNSs such as Instagram on which photographs are mainly posted, YouTube on which moving images are posted, Facebook on which daily activities are shared, Twitter on which sharing is performed to spread information, LINE on which message exchange is performed, and the like are widely used, and the present disclosure can be applied to an image posted to any type of SNS site. It is apparent that image processing according to the present disclosure may also be applied when an image is delivered to a third party not through an SNS or regardless of an SNS.

Although image processing according to the present disclosure is performed before an image is posted using an information terminal such as a smartphone or the like used by a user for posting in a basic embodiment, it is apparent that image processing according to the present disclosure can be performed similarly on an SNS site (server apparatus) before an image posted by a user is revealed to the public.

In the present disclosure, a topic of an image used for SNS posting is estimated, a region of interest is extracted from an image on the basis of the topic, and image processing for hiding such as trimming, mosaic processing, blurring, decoration, replacement, or the like is performed for a region other than the region of interest. In addition, in the present disclosure, a topic of an image is estimated mainly on the basis of a sentence such as a message posted in association with the image and tag information.

Thus, according to the present disclosure, by hiding a region other than a region of interest that does not match a topic of a posted image, personal information can be prevented from being carelessly leaked after the image is posted to an SNS site. In addition, according to the present disclosure, a region of interest matching a topic of a posted image is put on the posted image as it is, and thus an image reflecting which details a user desires to make public or spread can be posted to an SNS site.

B. APPARATUS CONFIGURATION

Figure 1:
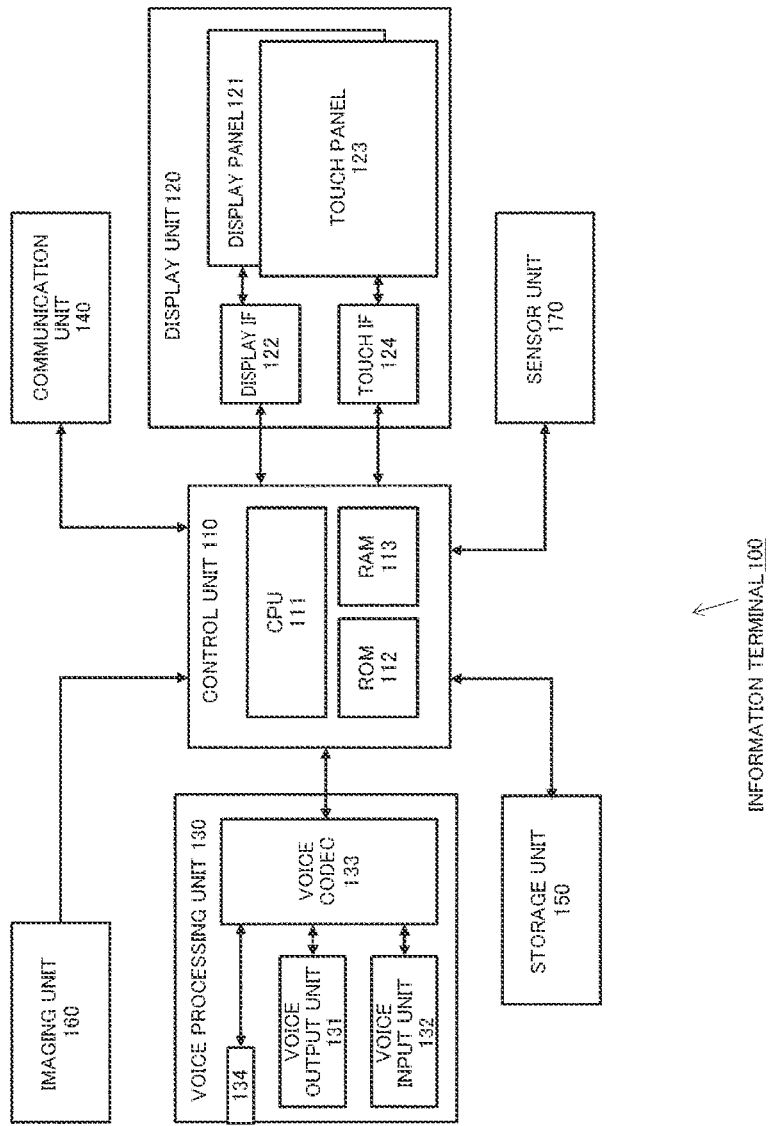
FIG. 1 is a diagram illustrating a configuration example of an information terminal 100.

FIG. 1 schematically illustrates a configuration example of an information terminal 100 to which the present disclosure can be applied. The information terminal 100, for example, corresponds to a smartphone, a tablet, or an information terminal of any other type and is configured by connecting a display unit 120, a voice processing unit 130, a communication unit 140, a storage unit 150, an imaging unit 160, a sensor unit 170, and the like to a control unit 110.

The control unit 110 is composed of a CPU 111, a read-only memory (ROM) 112, a random access memory (RAM) 113, and the like. In the ROM 112, a program code executed by the CPU 111, information that is necessary for the information terminal 100, and the like are stored.

The CPU 111 loads a program code into the RAM 113 from the ROM 112 or the storage unit 140 and executes the loaded program code. Examples of programs executed by the CPU 111 include an operating system (OS) such as Android, IOS, or the like and various application programs operating under an execution environment provided by the OS. The application programs described here are so-called smartphone applications and, for example, include applications such as a telephone, a camera, mail, a schedule, and the like. In this embodiment, SNS-dedicated applications such as Instagram, YouTube, Facebook, Twitter, LINE, and the like are included. In addition, in this embodiment, an image processing application performing the process of processing or the like on an image for SNS posting is also included.

The display unit 120 includes a display panel 121 formed from a liquid crystal element, an organic electroluminescence (EL) element, or the like and a transparent touch panel 123 that is stuck to an upper face of the display panel 121. The display panel 121 is connected to the control unit 110 through a display interface 122 and displays and outputs image information generated by the control unit 110. In addition, the touch panel 123 is connected to the control unit 110 through a touch interface 124 and outputs information of coordinates at which a user performs an operation on the display panel 121 with a fingertip to the control unit 110. The control unit 110 side detects a user's touch operation (tap, long press, flick, swipe, and the like) on the basis of the input coordinate information and starts a process corresponding to the user operation.

The voice processing unit 130 includes a voice output unit 131 such as a speaker or the like, a voice input unit 132 such as a microphone or the like, and a voice codec 133 that performs an encoding/decoding process on a voice signal that is input or output. In addition, the voice processing unit 130 may further include a voice output terminal 134 used for outputting a voice signal to a headphone (not illustrated).

The communication unit 140 performs an information communication process between an application executed by the control unit 110 and an external device (not illustrated). Examples of the external device described here include an information terminal handled by another user, a server on the Internet, and the like. The communication unit 140 is equipped with physical layer modules of Wi-Fi (registered trademark), Long Term Evolution (LTE), Bluetooth (registered trademark) communication, near field communication (NFC), and the like in accordance with a used communication medium and performs a modulation/demodulation process and encoding/decoding process of communication signals transmitted and received through the physical layer module.

The storage unit 150, for example, is formed from a large-capacity storage device such as a solid state drive (SSD), a hard disk drive (HDD), or the like. For example, an application program and content downloaded through the communication unit 140, image data such as a still image and a moving image captured by the imaging unit 160, and the like are stored in the storage unit 150.

The imaging unit 160, for example, includes an image sensor such as a complementary metal oxide semiconductor (CMOS) or a charge-coupled device (CCD) and outputs image data of a photograph, a moving image, or the like that has been captured to the control unit 110 through a camera interface (not illustrated). In this embodiment, the imaging unit 160 is assumed to be used for capturing an image for SNS posting.

The sensor unit 170 includes a Global Positioning System (GPS) sensor for acquiring position information of the information processing apparatus 2000, a gyro sensor for detecting a posture of a main body of the information terminal 100 and an applied force, an acceleration sensor, and the like.

A user of the information terminal 100 can download an application from an application distribution source and execute or operate an installed application in accordance with an input operation through the touch panel 123, depending on situations, in accordance with an input operation using a voice command. As execution and an operation of an application, for example, there are camera photographing, posting of a captured image to an SNS site, input of a message or tag information posted in accompaniment with an image, and the like.

C. FUNCTIONAL CONFIGURATION

On the information terminal 100, image processing for protecting privacy and security can be performed on an image such as a photograph, a moving image, or the like posted by a user to an SNS site on the basis of the present disclosure. On the information terminal 100, by performing image processing for hiding a region other than a region of interest that does not match a topic of a posted image, careless leakage of personal information after posting to an SNS site can be prevented. In addition, in image processing on the information terminal 100, a region of interest matching a topic in a posted image is put on the posted image as it is, and thus an image reflecting which details a user desires to make public or spread can be posted to an SNS site.

Figure 2:
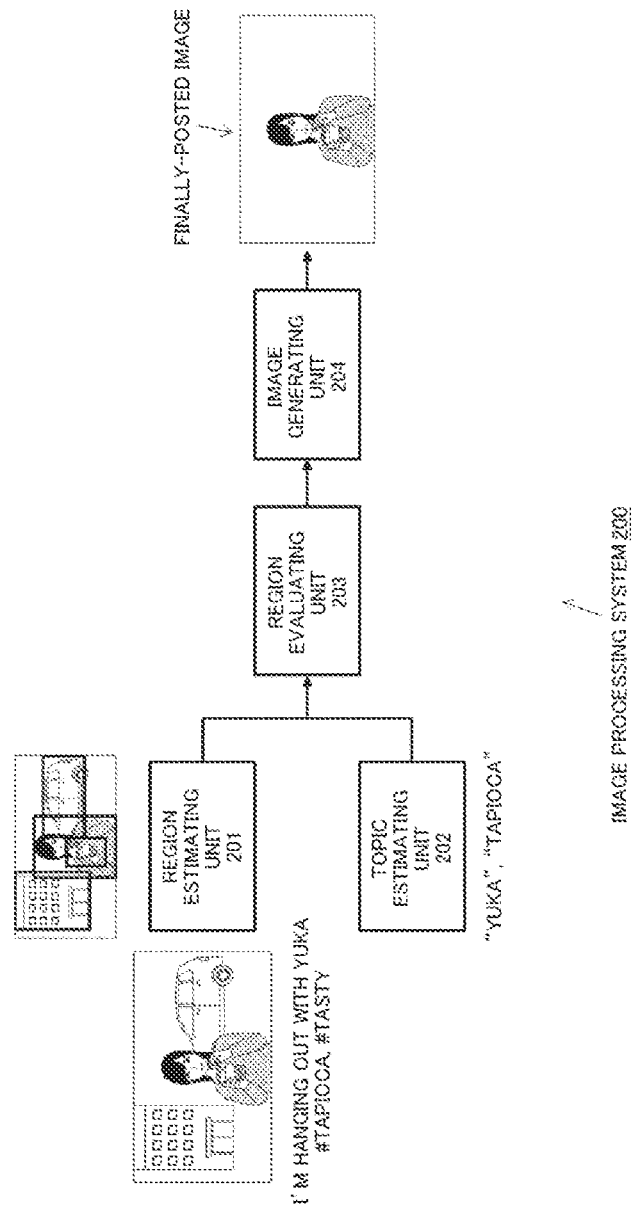
FIG. 2 is a diagram illustrating a functional configuration of an image processing system 200.

FIG. 2 schematically illustrates a functional configuration of an image processing system 200 performing image processing according to the present disclosure on an image posted to an SNS site. The illustrated image processing system 200 includes functional modules of a region estimating unit 201, a topic estimating unit 202, a region evaluating unit 203, and an image generating unit 204 for realizing image processing according to the present disclosure. Such functional modules, for example, are realized on the information terminal 100 (a smartphone) performing an operation of posting an image to an SNS site. Hereinafter, respective units will be described.

Input Information for System:

An image to be posted to an SNS site and text information such as a sentence, a tag, and the like to be posted together with the image are input to the image processing system 200 from the information terminal 100. As will be described below, the text information is used for estimating a topic of a posted image. Other information that can be used for estimating a topic such as a voice of a user input from the voice input unit 132, position information acquired from the sensor unit 170, and the like may be further input to the image processing system 200.

Region Estimation:

The region estimating unit 201 estimates a region that is a candidate for object detection in an image. In an image posted to an SNS site, for example, various objects such as a person and a beverage held by a person on the hand, a building and a road of a background, vehicles that are traveling on a road or have stopped, and street trees are assumed to be shown. The region estimating unit 201, in order to perform object detection in a process of a later stage, performs a process of estimating candidate regions in which an object may be present and cutting out each candidate region from an input image.

The region estimating unit 201, for example, may cut out candidate regions of object detection using a Selective Search algorithm (see NPL 1) that groups regions that are similar to each other on a pixel level and extracts the regions. In addition, the region estimating unit 201 may perform estimation of candidate regions using a machine learning model that has learned in advance such that candidate regions of object detection are estimated in an image in compliance with a specific algorithm such as the Selective Search.

Topic Estimation:

The topic estimating unit 202 estimates a topic or a subject of a posted image on the basis of text information accompanying the image such as characters, a tag, and the like posted together with the image. The text information accompanying an image, for example, is character information input through the touch panel 123. Alternatively, the text information may be text information acquired by converting a voice input from the voice input unit 132 into a text through voice recognition. The topic estimating unit 202 estimates words such as a person name of a subject, object names of objects (a beverage held by a person on the hand, a building and a road of a background, vehicles that are traveling on a road or have stopped, street trees, and the like) shown in the image, and the like as topics.

The topic estimating unit 202 may estimate a topic of an image by performing natural language processing of the entire sentence given to the posted image or may estimate a topic on the basis of keywords to which hash tags are assigned. The topic estimating unit 202 may calculate a degree of importance of each word appearing in posted text information, for example, on the basis of two indexes including a term frequency (tf) and an inverse document frequency (idf). In addition, from a point of view of posting to an SNS site, the topic estimating unit 202, for example, may estimate a topic by embedding social information such as weighting a word matching or being similar to a trending tag on an SNS.

In addition, the topic estimating unit 202 may estimate a topic further using a voice of a user input from the voice input unit 132 and position information acquired from the sensor unit 170 other than text information such as a sentence, a tag, and the like that are posted or may estimate a topic by referring to a user's schedule and the like managed by a schedule application of the information terminal 100 and the like.

Region Evaluation:

The region evaluating unit 203 evaluates each candidate region of object detection estimated by the region estimating unit 201 on the basis of a relationship with a topic estimated by the topic estimating unit 202 and determines whether or not the candidate region is a region of interest.

In this embodiment, the region evaluating unit 203 performs evaluation of each candidate region using an object detector detecting an object relating to a topic. A candidate region is input to an object detector, and, in a case in which an object corresponding to a topic is detected, the candidate region is determined as a region of interest and, in a case in which no object corresponding to a topic is detected, the candidate region is determined not to be a region of interest. Hereinafter, a candidate region other than a region of interest will be also referred to as a "region of no-interest". Alternatively, the region evaluating unit 203 may assign a score value based on a likelihood of being an object corresponding to a topic to each candidate region without outputting an evaluation result using a binary value indicating that the candidate region is a region of interest or a region of non-interest. In such a case, in the process of a later stage, candidate regions of a predetermined number from a side on which the score value is the highest may be handled as regions of interest, and the other regions may be handled as regions of non-interest.

Here, an object detector used by the region evaluating unit 203 will be described.

In a case in which a topic is a person name, in accordance with a combination of person detection detecting a person (or a face region) from a candidate region and face identification identifying a person from a detected face, it is determined whether or not a candidate region is a region of interest including a person of a person name of a topic, or a score is calculated. For example, in a case in which the topic estimating unit 202 estimates a person name such as "Yuka" as a topic, face identification is performed for a face of the person detected from the candidate region, and it is determined whether or not the identified face is a face image of "Yuka", or a score is calculated.

In addition, in a case in which a topic is an object name, by using an object detector relating to a corresponding object, it is determined whether or not an object relating to the topic is present in a candidate region, or a score is calculated. For example, in a case in which the topic estimating unit 202 estimates "tapioca" as a topic, by using an object detector of class "tapioca", detection of tapioca in the candidate region is attempted.

It is preferable that the region evaluating unit 203 prepare object detectors relating to various topics in advance. In addition, in a case in which an object detector relating to a topic cannot be prepared in advance, the region evaluating unit 203 estimates a relation between an image within a candidate region and a topic from an image group having the same object name and determines whether or not an object is present or calculates a score. Focusing on an application according to the present disclosure being related to an SNS, a huge amount of posted free images may be configured to be used on an SNS site. In other words, the region evaluating unit 203 may be configured to estimate a relation between an image inside a candidate region and a topic from an image group (to which the same tag as the topic is attached) of the same topic that has already been posted to an SNS site.

A weakly-supervised object detection technique for automatically detecting, from a plurality of image sets to which the same label is assigned, objects shown therein by considering that when there are only labels representing types of objects shown in an image, objects can be acquired relatively easily at low cost is known. For example, in a case in which an object detector of a class "tapioca" is not prepared in the region evaluating unit 203 when the topic estimating unit 202 estimates "tapioca" as a topic, an image group, to which "#tapioca" is attached, present at an SNS site may be collected, learning of an object detector may be performed using the image group as learning data, and an object detector of the class "tapioca" may be newly generated. More specifically, learning of an object detector is performed with a problem setting called weakly-supervised learning, and an object detector of the class "tapioca" is acquired. The weakly-supervised learning is a problem of estimating a region of a tapioca of which external shapes are common from an image set to which a tag "#tapioca" is attached and in which a place inside an image at which a tapioca is shown is not explicitly represented (see NPL 2). By learning an object detector relating to the tapioca from images of estimated regions of the tapioca, the object detector can be used as a new object detector in the region evaluating unit 203.

Image groups used for learning of the object detector do not need to be necessarily collected from an SNS site, and learning may be performed using other free images or non-free images relating to "tapioca".

Image Generation:

The image generating unit 204 generates an image to be finally posted to an SNS site on the basis of an evaluation result acquired by the region evaluating unit 203. The image generating unit 204 basically generates an image in which only a region of interest remains or an image in which display of a region of a non-interest is inhibited on the basis of a determination result acquired by the region evaluating unit 203. In addition, in a case in which the region evaluating unit 203 calculates a score of each candidate region instead of determining a region of interest and a region of non-interest, the image generating unit 204 performs a process of inhibiting display for candidate regions other than candidate regions of a predetermined number from the side of a highest score value.

The process of inhibiting display is a process of reducing visibility by applying blurring or mosaic processing, a process of completely cutting out to be invisible, a process of replacing with another image, or the like. Which image processing is to be performed for inhibiting display of a region of non-interest may be instructed by a user through the touch panel 123 or the like in the process of generating an image or posting an image to an SNS site.

In addition to the process of inhibiting display of a region of non-interest, the image generating unit 204 may perform a process of emphasis displaying a region of interest. The emphasis displaying is a process of improving luminance or resolution of a corresponding candidate region, a process of attaching a decoration to a person or an object corresponding to a topic, or the like. Which image processing is performed for a region of interest may be instructed by a user through the touch panel 123 or the like in the process of generating an image or posting an image to an SNS site.

In addition, the image generating unit 204 may generate a plurality of patterns of output candidate images in which only a region of interest remains or output candidate images in which display of a region of non-interest is inhibited and allow a user to select which output candidate image is to be finally output (in other words, to be posted to an SNS site).

A case in which a region of interest determined by the region evaluating unit 203 does not coincide with a user's intention is also considered. For this reason, the image generating unit 204 may allow resetting of a region of interest and a region of non-interest through a user's manual operation by presenting a generated image to the user. In a case in which a user performs resetting of a region of interest and a region of non-interest, by performing error back propagation of a result of the user's manual operation, the object detector may be caused to perform relearning.

D. PROCESSING PROCEDURE FOR GENERATING POSTING IMAGE

Figure 3:
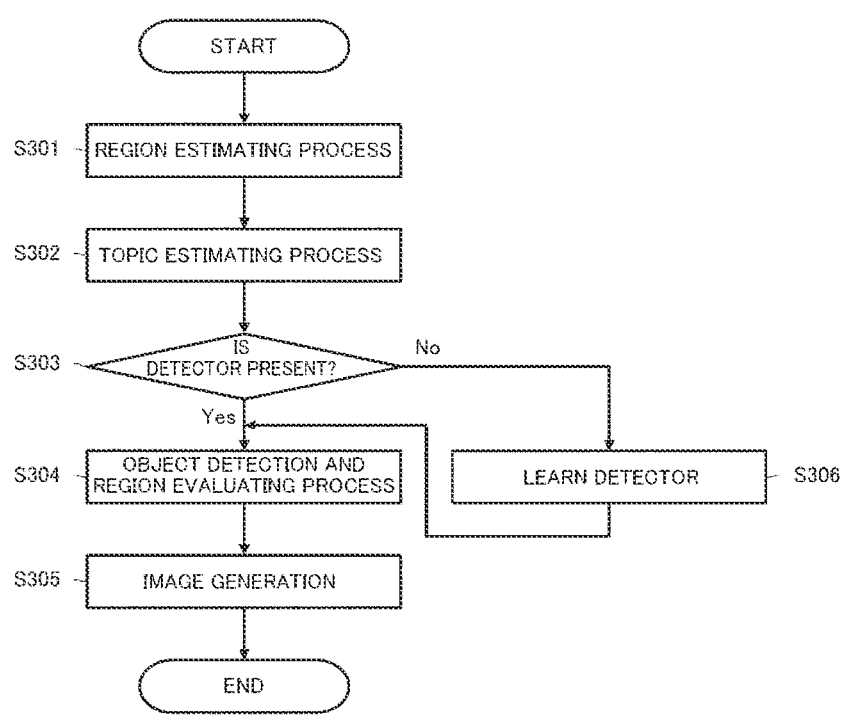
FIG. 3 is a flowchart illustrating a procedure for processing an image posted to an SNS site.

FIG. 3 illustrates a basic procedure for processing an image to be posted to an SNS site in the image processing system 200 illustrated in FIG. 2 in the form of a flowchart.

When an image to be posted to an SNS site and text information such as a sentence, a tag, and the like posted together with the image are input to the image processing system 200, first, a region estimating process of estimating regions that are candidates for object detection in an image using the region estimating unit 201 (Step S301) and a process of estimating a topic of a posted image using the topic estimating unit 202 (Step S302) are respectively performed. For the convenience of description, although FIG. 3 illustrates execution in order of the region estimating process and the topic estimating process, these two processes may be performed in a reverse order or performed simultaneously in parallel.

In Step S301, in order to perform object detection in a process of a later stage, the region estimating unit 201 estimates candidate regions in which an object is likely to be present and performs a process of cutting out each candidate region from an input image. For example, by using a specific algorithm such as Selective Search, the region estimating unit 201 may estimate candidate regions.

In Step S302, the topic estimating unit 202 estimates a topic of a posted image on the basis of text information such as characters, a tag, and the like posted together with the image. The topic estimating unit 202 estimates words such as a person name of a subject, object names of objects (a beverage held by a person on the hand, a building and a road of a background, vehicles that are traveling on a road or have stopped, street trees, and the like) shown in an image, and the like as topics. The topic estimating unit 202, for example, may calculate a degree of importance of each word appearing in text information posted on the basis of ti-idf or may perform estimation of a topic by embedding social information by assigning weights to words that match or are similar to a tending tag on an SNS or the like.

Next, the region evaluating unit 203 checks whether or not an object detector relating to the topic estimated in Step S302 has already been prepared (Step S303).

In a case in which an object detector relating to a topic has not been prepared (No in Step S303), the region evaluating unit 203 performs learning of a new object detector relating to the topic (Step S306). For example, an image group to which tags of the same topic are attached is collected from an SNS site through weaky-supervised learning, and learning of an object detector relating to the topic is performed using this as a weak teacher.

Next, the region evaluating unit 203 evaluates each candidate region estimated by the region estimating unit 201 in Step S301 on the basis of a relationship with the topic estimated by the topic estimating unit 202 in Step S302 using an object detector that has been prepared in advance or a newly-learned object detector and determines whether or not the candidate region is a region of interest (Step S304).

Then, the image generating unit 204 generates an image in which only a region of interest remains or an image in which display of a region of non-interest is inhibited from an input image and outputs the generated as an image that is finally posted to an SNS site (Step S305).

In Step S305, the image generating unit 204 may generate a plurality of patterns of output candidate images in which only a region of interest remains or output candidate images in which display of a region of non-interest is inhibited and allow a user to select which output candidate image is to be finally output (in other words, to be posted to an SNS site).

In addition, in Step S305, the image generating unit 204 may allow resetting of a region of interest and a region of non-interest through a user's manual operation by presenting a generated image to the user. In a case in which a user performs resetting of a region of interest and a region of non-interest, by performing error back propagation of a result of the user's manual operation, the object detector may be caused to perform relearning.

E. SPECIFIC EXAMPLE

E-1. Specific Example (1)

Figure 4:
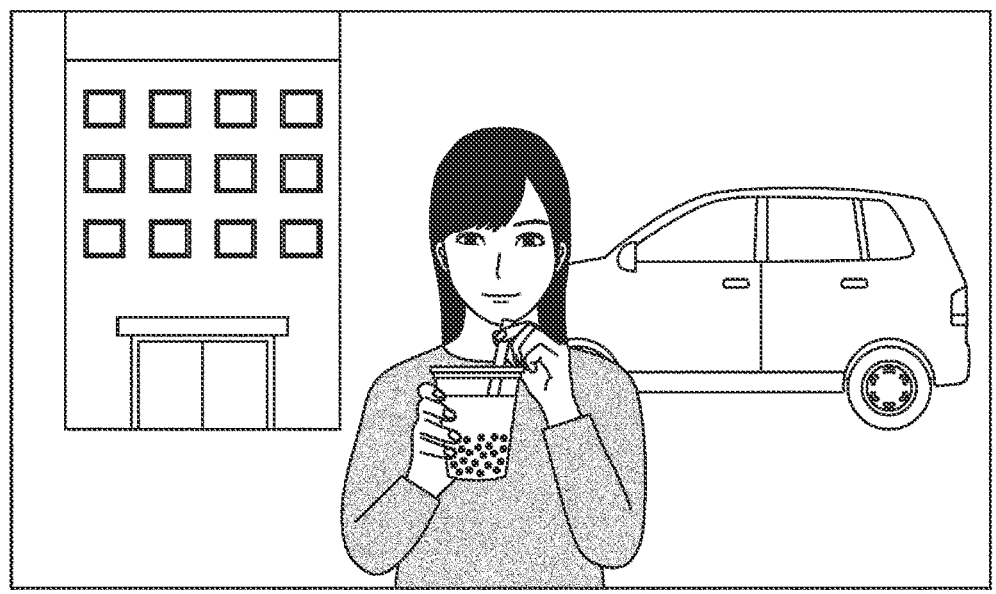
FIG. 4 is a diagram illustrating an example of an image input to the image processing system 200.

FIG. 4 is a diagram illustrating an example of an image input to the image processing system 200. It is assumed that this input image is an image captured by a user for the purpose of posting it to an SNS site on the information terminal 100. In this image, a female having a tapioca drink on the foreground and a building such as a building of a school and a car traveling on a road as a background are shown. A user is assumed to post a sentence "I'm hanging out with Yuka" and tags "#tapioca" and "#tasty" to an SNS site together with this image.

Figure 5:
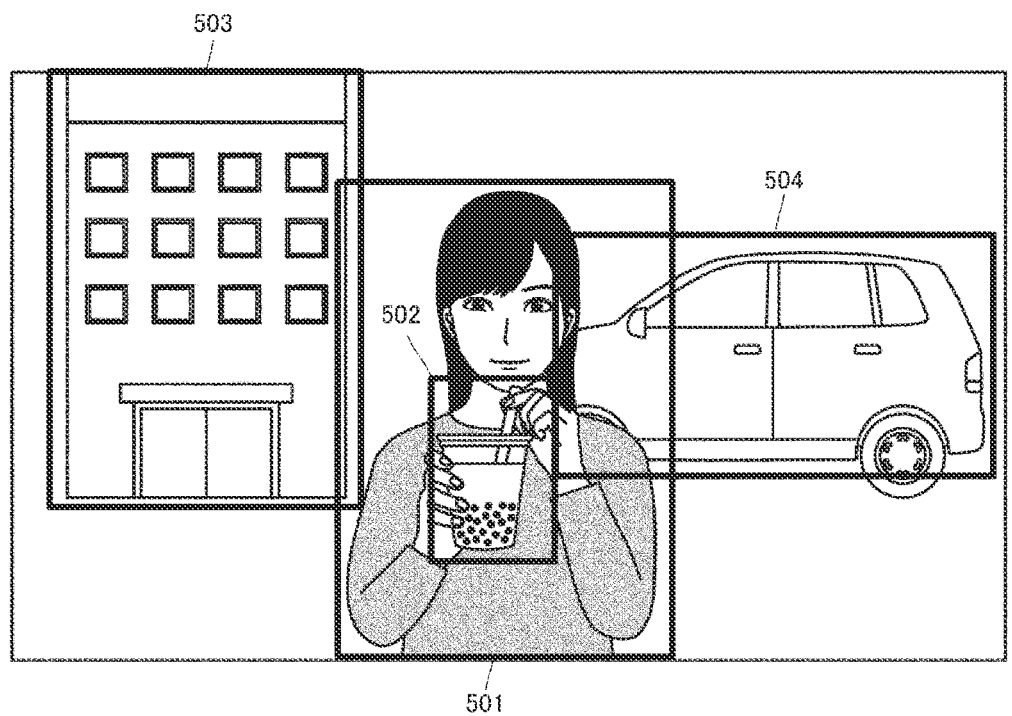
FIG. 5 is a diagram illustrating a result of region estimation for an image illustrated in FIG. 4.

FIG. 5 illustrates a result of estimation, which is performed by the region estimating unit 201, of regions that are candidates for object detection from the input image illustrated in FIG. 4. In the example illustrated in FIG. 5, a candidate region 501 including a person at the center in the foreground of the image, a candidate region 502 including a cup into which tapioca has been put, a candidate region 503 including a building of the background, and a candidate region 504 including a car are extracted.

The topic estimating unit 202 estimates words, which become topics of the image, that are person name "Yuka" and object name "tapioca" from the sentence "I'm hanging out with Yuka" and the tags "#tapioca" and "#tasty" input together with the image illustrated in FIG. 4.

When person detection is performed for each of the candidate regions 501 to 504, and the person detection from the candidate region 501 is successful, the region evaluating unit 203 further performs identification of a face for a face image of the person, checks that the face matches the person name "Yuka" of the topic, and determines the candidate region 501 as a region of interest.

In addition, the region evaluating unit 203 prepares an object detector of class "tapioca". In a case in which an object detector of class "tapioca" has not be able to be prepared in advance, the region evaluating unit 203 collects an image group, to which "#tapioca" is attached, present in an SNS site, performs weakly-supervised learning of an object detector using the image group as learning data, and acquires the object detector of class "tapioca". Then, the region evaluating unit 203 attempts detection of tapioca by inputting the candidate regions 501 to 504 to the object detector of class "tapioca" and, when detection of "tapioca" from the candidate region 502 is successful, determines the candidate region 502 as a region of interest.

Figure 6:
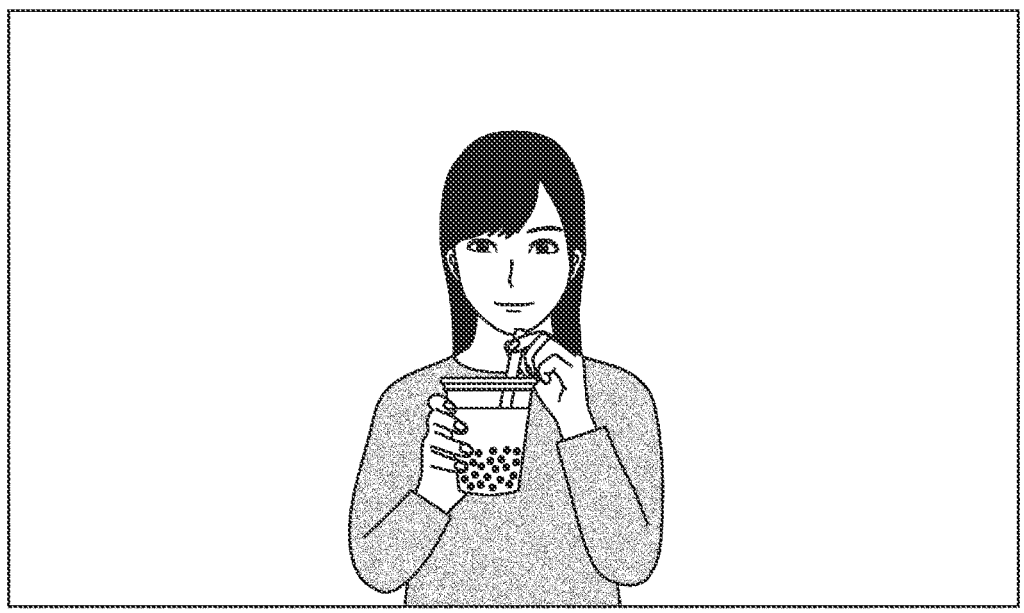
FIG. 6 is a diagram illustrating an example of an image generated from an input image illustrated in FIG. 4.

FIG. 6 illustrates a final posting image generated by the image processing system 200 from the input image illustrated in FIG. 4. The image generating unit 204 generates a final posting image illustrated in FIG. 6 by causing the candidate region 501 and the candidate region 502 to remain and completely cutting out the candidate region 503 and the candidate region 504 on the basis of a result of determination acquired by the region evaluating unit 203 in which the candidate region 501 and the candidate region 502 are determined as regions of interest. The building included in the candidate region 503 and the car included in the candidate region 504 are not topics, in other words, a main purpose of posting. Thus, as illustrated in FIG. 6, even when the images of such backgrounds are deleted or replaced with other images, a resultant image is still an image in which details desired by a user to made public or be spread are reflected, and careless leakage of information relating to privacy and security of the user from the images of the school and the car of the background can be prevented.

E-2. Specific Example (2)

Figure 7:
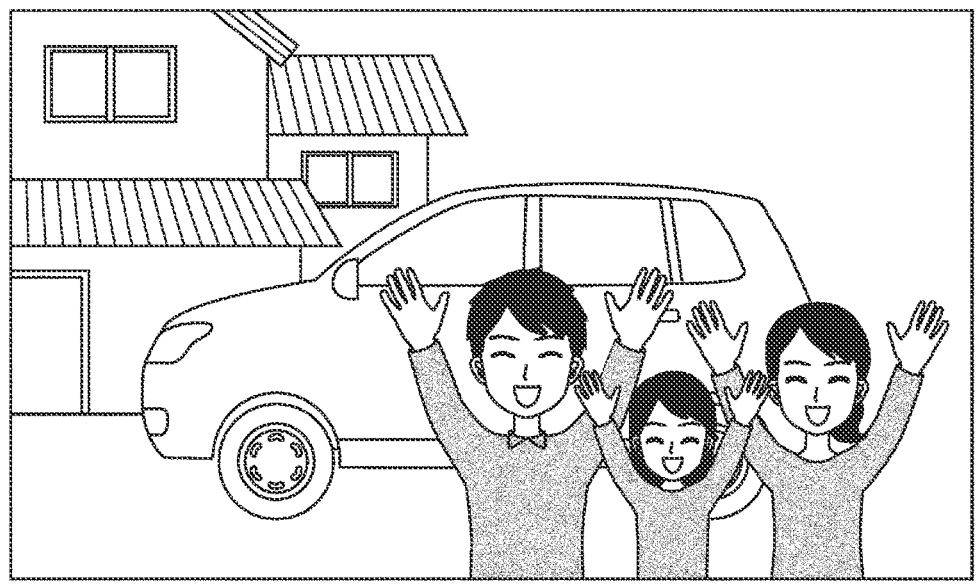
FIG. 7 is a diagram illustrating another example of an image input to the image processing system 200.

FIG. 7 illustrates another example of an image input to the image processing system 200. It is assumed that this input image is also an image captured by a user for the purpose of posting it to an SNS site on the information terminal 100. In this image, three family members of the foreground and a house and a car as the background are shown. A user is assumed to post a sentence "We bought a car. I'm looking forward to having a family trip!" to an SNS site together with this image.

Figure 8:
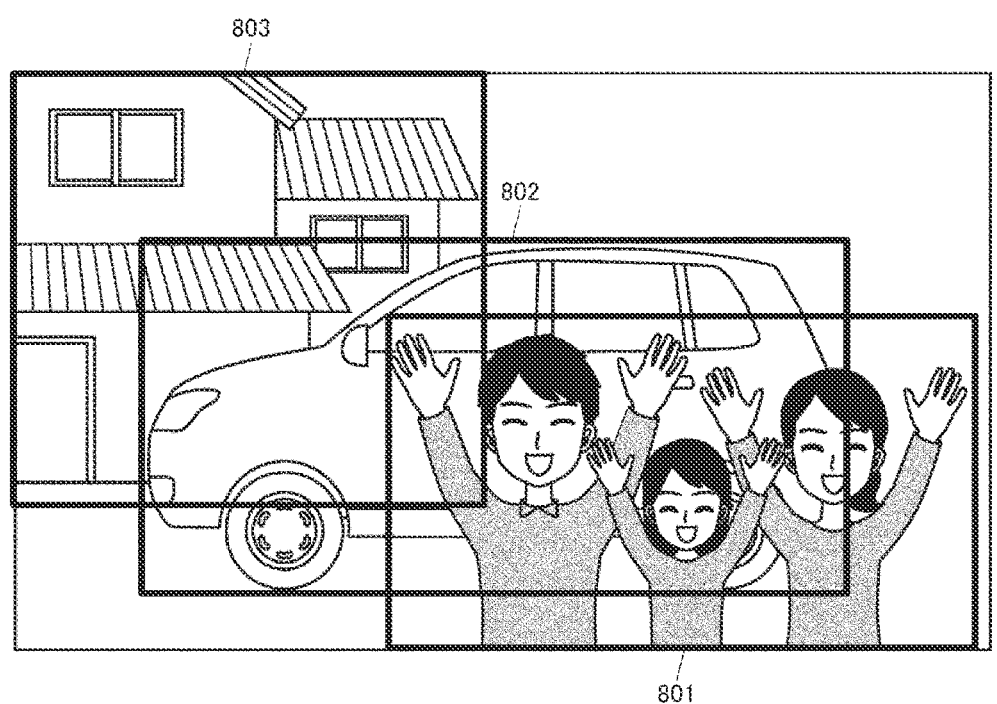
FIG. 8 is a diagram illustrating a result of region estimation for an image illustrated in FIG. 7.

FIG. 8 illustrates a result of estimation, which is performed by the region estimating unit 201, of regions that are candidates for object detection from the input image illustrated in FIG. 7. In the example illustrated in FIG. 8, a candidate region 801 including three family members of the foreground, a candidate region 802 including the car of the rear side of the family members, and a candidate region 803 including the house of the background of the image are extracted.

The topic estimating unit 202 estimates words, which become topics of the image, that are "car", "family members", and "trip" from the sentence "We bought a car. I'm looking forward to having a family trip!" input together with the image illustrated in FIG. 7.

The region evaluating unit 203 prepares object detectors of classes "car", "family members", and "trip". In a case in which an object detector of any one of the classes has not been able to be prepared in advance, the region evaluating unit 203 collects an image group to which a corresponding tag is attached on an SNS site, performs weakly-supervised learning of an object detector using the image group as learning data, and acquires the object detector of the class. Then, the region evaluating unit 203 attempts detection of an object corresponding to each topic by inputting the candidate regions 801 to 803 to the object detectors of the classes one by one.

An object detector of the class "car" succeeds to detect "car" from the candidate region 803 and determines the candidate region 803 as a region of interest. In addition, an object detector of the class "family members" succeeds to detect "family members" from the candidate region 801 and determines the candidate region 801 as a region of interest. Furthermore, an object detector of the class "trip" succeeds in detection of a car relating to "trip" from the candidate region 803 and determines the candidate region 803 as a region of interest.

Figure 9:
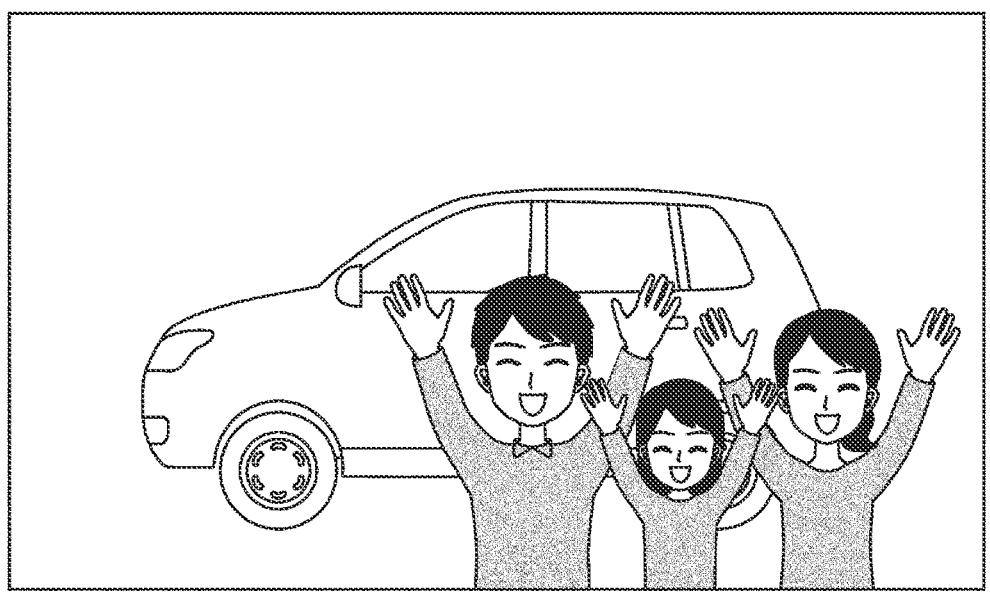
FIG. 9 is a diagram illustrating an example of an image generated from an input image illustrated in FIG. 7.

FIG. 9 illustrates a final posting image generated by the image processing system 200 from the input image illustrated in FIG. 7. The image generating unit 204 generates a final posting image illustrated in FIG. 9 by causing the candidate region 801 and the candidate region 802 to remain and completely cutting out the candidate region 803 on the basis of a result of determination acquired by the region evaluating unit 203 in which the candidate region 801 and the candidate region 802 are determined as regions of interest. The house included in the candidate region 803 is not a topic, in other words, a main purpose of posting. Thus, as illustrated in FIG. 9, even when the image of the house present in the background is deleted or replaced with another image, a resultant image is still an image in which details desired by a user to made public or be spread are reflected, and careless leakage of information relating to privacy and security of the user from the following image of the background can be prevented.

F. MODIFICATION EXAMPLE

F-1. System Configuration

Figure 10:
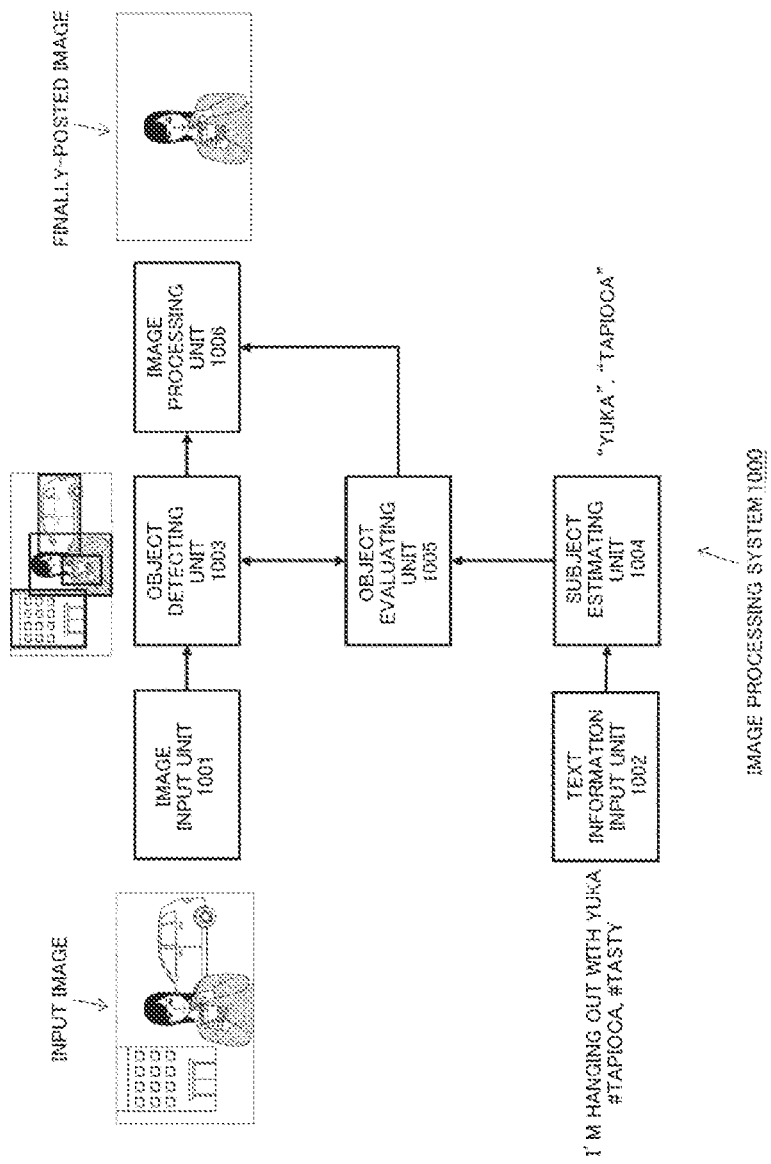
FIG. 10 is a diagram illustrating a functional configuration of an image processing system 1000.

FIG. 10 schematically illustrates a functional configuration of a modification example of an image processing system that performs image processing according to the present disclosure for an image posted to an SNS site. In order to realize image processing according to the present disclosure, the image processing system 1000 illustrated in FIG. 10 includes an image input unit 1001, a text information input unit 1002, an object detecting unit 1003, a subject estimating unit 1004, an object evaluating unit 1005, and an image processing unit 1006. Such functional modules, for example, are realized on the information terminal 100 (smartphone) performing an operation of posting an image to an SNS site. Hereinafter, respective units will be described.

Image Input:

The image input unit 1001 inputs an image to be posted to an SNS site from the information terminal 100. The posting image, for example, is an image captured by the imaging unit 160. It is apparent that the image input unit 1001 may receive an image acquired from a network through the communication unit 140 as an image posted to an SNS. Furthermore, in addition to input of a posting image from the image input unit 1001, other information such as position information acquired by the sensor unit 170 that can be used for estimating a topic may be further input to the image processing system 1000.

Text Information Input:

The text information input unit 1002 inputs text information accompanying an image for an SNS. The text information, for example, is characters, tags, and the like posted together with an image. The text information input unit 1002, for example, inputs text information through the touch panel 123. In addition, the text information input unit 1002 may input text information converted into a text by performing voice recognition of a voice input from the voice input unit 132.

Object Detection:

The object detecting unit 1003 detects objects included in an image input by the image input unit 1001. In an image posted to an SNS, various objects, for example, such as a person and a beverage held by a person on the hand, a building and a road of a background, vehicles that are traveling on a road or have stopped, street trees are assumed to be shown. The object detecting unit 1003 detects persons and object from the input image.

The object detecting unit 1003, for example, may cut out candidate regions of object detection using a Selective Search algorithm (see NPL 1) that groups regions that are similar to each other on a pixel level and extracts the regions and then inputs each of the candidate regions to an object detector and performs object detection. In order to detect various object relating to subjects, the object detecting unit 1003 prepares a plurality of object detectors in advance and, by inputting a candidate region to each object detector, detects an object of each region inside an input image. In addition, in a case in which there is a candidate region that is unable to be detected by object detectors that have been equipped in advance, for example, in a case in which there is no object detector relating to a subject of an input image, by using a weakly-supervised object detection technology, an object detector capable of detecting an object relating to a subject may be newly generated. For example, although "tapioca" is estimated as a subject of an input image by the subject estimating unit 1004 to be described below, in a case in which the object detecting unit 1003 does not include an object detector of class "tapioca" in advance, an image set of which subjects (for example, hash tagged keywords) match or is similar to "tapioca" is collected at low coat from a huge amount of free images posted to an SNS site, and learning of an object detector of class "tapioca" is performed using this image set as learning data.

In addition, in a case in which persons are to be detected, the object detecting unit 1003 performs face identification of faces of persons detected from a cut out candidate region, for example, using the Selective Search algorithm.

Subject Estimation:

The subject estimating unit 1004 estimates a subject of an input image on the basis of the image input from the image input unit 1001 and text information input from the text information input unit. A subject described here corresponds to a topic in an SNS. Thus, the subject estimating unit 1004 may estimate a subject of an image by performing natural language processing on the entire sentence attached to the posted image or may estimate a subject of an input image on the basis of keywords that are hash tagged. The subject estimating unit 1004 may calculate a degree of importance of each word appearing in posted text information input from the text information input unit 1002, for example, on the basis of two indexes including a term frequency (tf) and an inverse document frequency (idf). In addition, from a point of view of posting to an SNS site, the subject estimating unit 1004, for example, may estimate a subject of an input image by embedding social information such as weighting a word matching or being similar to a trending tag on an SNS.

Object Evaluation:

The object evaluating unit 1005 evaluates a degree of relation of each object detected by the object detecting unit 1003 with a subject estimated by the subject estimating unit 1004. An object having a high degree of relation with a subject can be regarded as an "object of interest" that is desired to be viewed with interest for a viewer of a posted image. In addition, an object having a low degree of relation with a subject can be regarded as an "object of non-interest" that is not desired much to be viewed with interest for a viewer of a posted image. A degree of relation of an object with a subject, for example, is evaluated on the basis of a degree of matching or a degree of similarity between a class name of an object detector that has detected the object and the subject. In addition, in a case in which an object is a person, a degree of relation with a subject is evaluated on the basis of a degree of matching or a degree of similarly between a person name specified by identifying a face and the subject.

Image Processing:

The image processing unit 1006 performs image processing on each object on the basis of an evaluation result acquired by the object evaluating unit 1005 for each object shown in an input image, thereby generating an image to be finally posted to an SNS. As described above, the object evaluating unit 1005 outputs a degree of relation of each object shown in the input image with a subject. An object having a high degree of relation with a subject is an "object of interest" desired to be viewed with interest for a viewer of a posted image, and an object having a low degree of relation with a subject is an "object of non-interest" that is not desired much to be viewed with interest for a viewer of a posted image. Thus, the image processing unit 1006 performs a process of inhibiting display for an object evaluated to be an object of non-interest.

The process of inhibiting display is a process of reducing visibility by applying blurring or mosaic processing, a process of completely cutting out to be invisible, a process of replacing with another image, or the like. Which image processing is to be performed for inhibiting display of an object of non-interest may be instructed by a user through the touch panel 123 or the like.

In addition to the process of inhibiting display of an object of non-interest, the image processing unit 1006 may perform a process of emphasis displaying an object of interest. The emphasis displaying is a process of improving luminance or resolution of a corresponding candidate region, a process of attaching a decoration to a person or an object having a high degree of relation with a subject, or the like. Which image processing is performed for an object of interest may be instructed by a user through the touch panel 123 or the like.

In addition, the image processing unit 1006 may generate a plurality of patterns of output candidate images in which only an object of interest remains or output candidate images in which display of an object of non-interest is inhibited and allow a user to select which output candidate image is to be finally output (in other words, to be posted to an SNS site).

F-2. Processing Procedure for Generating a Posted Image

Figure 11:
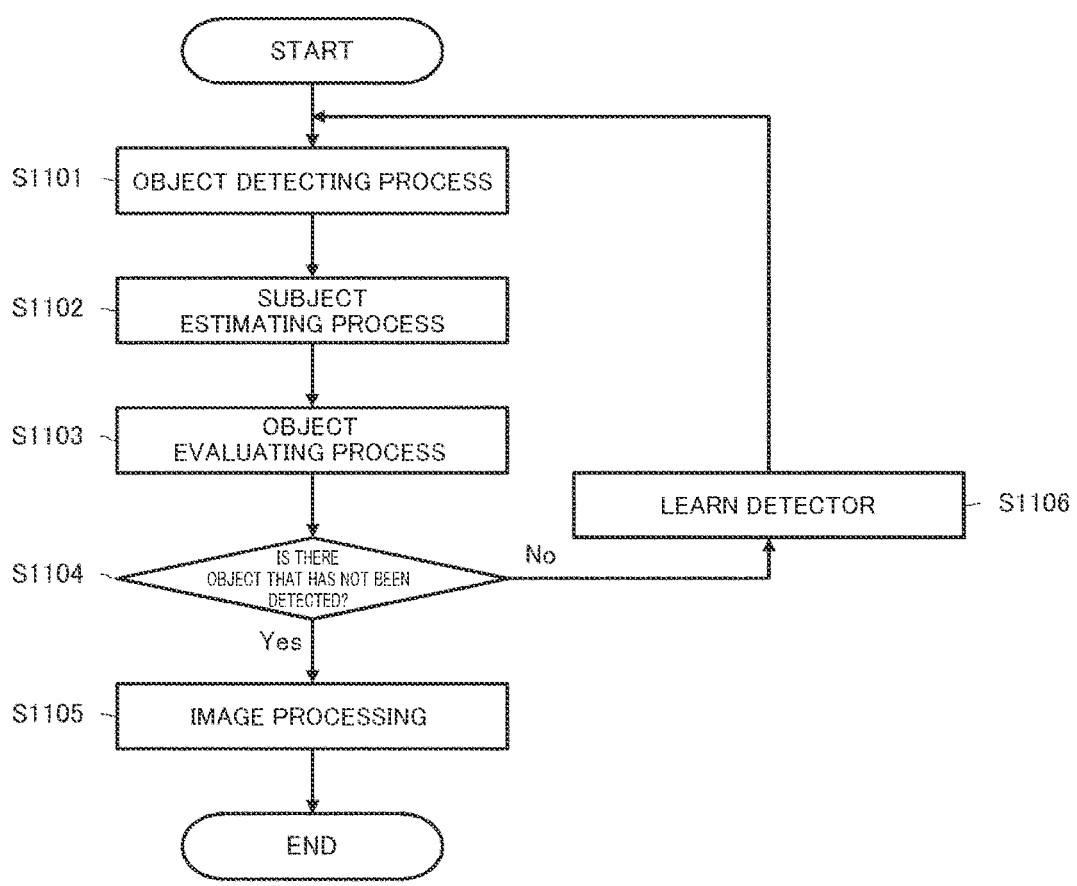
FIG. 11 is a flowchart illustrating a procedure for processing an image posted to an SNS site.

FIG. 11 illustrates a basic procedure for processing an image to be posted to an SNS site in the image processing system 1000 illustrated in FIG. 10 in the form of a flowchart.

When an image to be posted to an SNS site and text information such as a sentence, a tag, and the like posted together with the image are input to the image processing system 1000, first, the object detecting unit 1003 detects objects in the input image (Step S1101). The object detecting unit 1003 detects objects in the input image using an object detector equipped in advance. In addition, the object detecting unit 1003 detects a face image from the input image and performs face identification for a detected face, thereby identifying a person. Next, the subject estimating unit 1004 estimates a subject of the input image on the basis of the image input from the image input unit 1001 and text information input from the text information input unit (Step S1102). Here, the execution order of the object detecting process of Step S1101 and the subject estimating process of Step S1102 may be reversed.

Next, the object evaluating unit 1003 evaluates a degree of relation of each object detected by the object detecting unit 1003 with the subject estimated by the subject estimating unit 1004 (Step S1103). A degree of relation of an object with a subject, for example, is evaluated on the basis of a degree of matching or a degree of similarity between a class name of an object detector that has detected the object and the subject. In addition, in a case in which an object is a person, the degree of relation is evaluated on the basis of a degree of matching or a degree of similarity between a person name specified through face identification and a subject.

Next, it is checked whether or not all the objects having a high degree of relation with the subject estimated by the subject estimating unit 1004 have been detected in Step S1101 (Step S1104).

Objects having a high degree of relation with a subject estimated by the subject estimating unit 1004 not having been detected yet (No in Step S1104) may be assumed in a case in which an object corresponding to the subject is not shown in the input image and a case in which, although an object corresponding to the subject is shown in the input image, a corresponding object detector is not equipped, and the object detecting unit 1003 cannot detect the object. In a latter case, appropriate image processing cannot be performed on a posted image in a subsequentially process. Thus, the object detecting unit 1003 performs learning of an object detector used for detecting an object corresponding to a subject which has a high degree of relation but for which evaluation of the object was not able to be performed in Step S1103 (Step S1106). For example, an image group to which a tag relating to a subject that has not been evaluated is collected from an SNS site through weakly-supervised learning, and learning of an object detector relating to the topic is performed using this as a weak teacher. Thereafter, the process returns to Step S1101, and detection of an object corresponding to a subject that has not been evaluated using a newly-prepared object detector (Step S1101) and evaluation of a degree of relation of the detected object with the subject (Step S1102) are repeatedly performed.

Then, the image processing unit 1006 performs image processing on each object on the basis of an evaluation result acquired by the object evaluating unit 1005 for each object shown in the input image and generates an image to be finally posted to the SNS (Step S1105). In Step S1105, the image processing unit 1006 performs the process of inhibiting display such as a process of reducing visibility by applying blurring or mosaic processing, a process of completely cutting out to be invisible, a process of replacing with another image, or the like for an object evaluated to be an object of non-interest.

F-3. Specific Example

A processing operation performed when the image illustrated in FIG. 4 is input to the image processing system 1000 will be described below. In the image illustrated in FIG. 4, a female having a tapioca drink of the foreground and buildings such as a building of a school and the like and a car traveling on a road as a background are shown. Here, a user is assumed to post a sentence "I'm hanging out with Yuka" and tags "#tapioca" and "#tasty" to an SNS site together with the image illustrated in FIG. 4.

The object detecting unit 1003 detects object in the input image illustrated in FIG. 4 using object detectors equipped in advance. Here, a person 501 at the center in the foreground of the image is detected, and a building 503 and a car 504 of the background are detected respectively using object detectors of class "building" and class "car" equipped in advance. Here, it is assumed that an object detector of class "tapioca" is not included, and thus the object detector 1003 was not able to detect a cup in which tapioca is put in the input image illustrated in FIG. 4. In addition, the object detecting unit 1003 performs face identification for a detected face of the image 501 including the face, and a person "Yuka" is identified.

In addition, the subject estimating unit 1004 estimates words that are person name "Yuka" and object name "tapioca" as subjects of the input image illustrated in FIG. 4 on the basis of the sentence "I'm hanging out with Yuka" and the tags "#tapioca" and "#tasty" input from the text information input unit.

The object evaluating unit 1003 evaluates degrees of relation of the person "Yuka" 501, "building" 503, and "car" 504 detected by the object detecting unit 1003 with subjects "Yuka" and "tapioca". Since the person "Yuka" 501 matches the subject "Yuka", the object evaluating unit 1003 evaluates that a degree of relation with the subject of the input image illustrated in FIG. 4 is high. In addition, since each object of "building" 503 and "car" 504 does not match any of the subjects, the object evaluating unit 1003 evaluates that such objects 503 and 504 to have no degree or a very low degree of relation with the subjects of the input image illustrated in FIG. 4.

An object having a high degree of relation with subject "tapioca" has not been detected yet. It is assumed that an object detector of class "tapioca" is not equipped, and thus the object detecting unit 1003 is not able to detect an object having a high degree of relation with the subject "tapioca". Thus, the object detecting unit 1003 performs learning of an object detector of the class "tapioca". For example, an image group, to which "#tapioca" is attached, present in the SNS site is collected, and weakly-supervised learning of an object detector is performed using the image group as learning data, whereby an object detector of the class "tapioca" is acquired.

Thereafter, the object detecting unit 1003 succeeds in detection of "tapioca" 502 from the input image illustrated in FIG. 4 using the object detector of the class "tapioca" that has been newly prepared. Since the object "tapioca" 502 matches the subject "tapioca", the object evaluating unit 1003 evaluates that the object "tapioca" to have a high degree of relation with the subjects of the input image illustrated in FIG. 4.

The image processing unit 1006 performs image processing on each object on the basis of an evaluation result acquired by the object evaluating unit 1005 for each object shown in an input image, thereby generating an image to be finally posted to an SNS. The image generating unit 1006 generates an image as illustrated in FIG. 6 from the input image illustrated in FIG. 4. In other words, the image generating unit 1006 causes the person "Yuka" 501 and the object "tapioca" of which degrees of relation with the subjects have been evaluated to be high to remain and deletes the objects "building" 503 and "car" 504 of which degrees of relation with the subjects have been evaluated to be low. As a result, an image in which details desired by a user to be made public or spread are reflected can be posted to an SNS, and careless leakage of information relating to privacy and security of the user from the posted image can be prevented.

G. MODIFIED EXAMPLE

G-1. Application to Moving Image

Up to here, for simplification of description, an example in which a photograph, that is, a still image is posted to an SNS site has been described. Use of an SNS site to which a moving image is posted such as a story of Instagram, TikTok, or YouTube is participation as well, and the present disclosure can be applied also when a moving image that is not only a photograph is posted.

When the processes as described in items C and D described above are performed for each frame of a moving image, a candidate region determined to be a region of interest in one frame may be determined not to be a region of interest or disappear in the next frame, and thus there is concern that an unstable operation is formed. Thus, in a case in which the image processing system 200 handles a moving image, by applying an object tracking technology in the region estimating unit 201, the operation may be stabilized by tracking a region of an object.

G-2. Application to Moving Image with Voice

When a region of interest is determined by the region evaluating unit 203, a voice may be used. The topic estimating unit 202 converts a voice into text information by performing voice recognition for the input voice of a user or the like and, similar to a sentence and a tag input by the user, uses the converted text information for estimation of a topic. In addition, by detecting tension from a laughing sound, a sound volume, or the like, the region evaluating unit 203 may evaluate a degree of interest or a degree of importance for each scene on the basis of a degree of the tension.

Furthermore, in a case in which a voice is desired to be posted together with an image and a sentence, there are cases in which personal information is desired to be eliminated from the voice. By causing only speech relating to a topic estimated by the topic estimating unit 202 from a sentence or a tag to remain and deleting or inhibiting the other parts, voice information in which details desired by a user to be made public or spread are reflected is still maintained, and careless leakage of information relating to privacy and security of the user from the other voice information can be prevented. Causing speech relating to a topic to remain, for example, is to cause only a sound of "Yuka" to remain using a technology of extracting speech of a specific speaker, causing only speech in which words common to a topic are used to remain, or the like.

H. EFFECTS

Effects acquired by the image processing system 200 according to the present disclosure performing processing on an image posted to an SNS site will be summarized.

(1) The image processing system 200 generates a final posting image by estimating a topic from a sentence or a tag input at the time of posting an image and performing processing with a weight attached to a region of interest relating to a topic and thus can post an image in which details desired by a user to be made public or spread are reflected while preventing leakage of information relating to privacy and security of the user.

(2) While the image processing system 200 performs a process of determining a region of interest using an object detector relating to a topic, in a case in which an object detector relating to a topic estimated by the topic estimating unit 202 was unable to be prepared in advance, an object detector can be acquired using an image group present at the SNS site, and thus protection of privacy of a posted image can be realized in correspondence with wide topics.

INDUSTRIAL APPLICABILITY

The present disclosure has been described in detail above with reference to a specific embodiment. However, it will be apparent to those skilled in the art that modification and substation of the embodiment can be made without departing from the gist of the present disclosure.

In this specification, although an embodiment in which image processing relating to the present disclosure is applied to an image posted by a user to an SNS site has been focused in description, the present disclosure is not limited thereto. According to the present disclosure, image processing such as trimming, mosaic processing, blurring, decoration, replacement, and the like can be performed on various images captured by a user without deviating from a user's intention.

In short, the present disclosure has been described in the form of an example, and the contents of the present specification should not be construed in a limited manner. The gist of the present disclosure should be determined in consideration of the claims.

Meanwhile, the present disclosure may also be configured as follows.

(1) An information processing apparatus including: a region estimating unit configured to estimate candidate regions of object detection from an image; a topic estimating unit configured to estimate a topic of the image on the basis of text information accompanying the image; a region evaluating unit configured to evaluate the candidate regions estimated by the region estimating unit on the basis of relationships with the topic estimated by the topic estimating unit; and an image generating unit configured to generate an image on the basis of evaluation results acquired by the region evaluating unit.

(2) The information processing apparatus according to (1) described above, wherein the region estimating unit estimates the candidate regions using an algorithm for grouping regions that are similar on a pixel level and extracting regions.

(3) The information processing apparatus according to (1) or (2) described above, wherein the topic estimating unit estimates the topic on the basis of words with high degrees of importance included in the text information.

(4) The information processing apparatus according to any one of (1) to (3) described above, wherein the topic estimating unit estimates the topic on the basis of words to which tags are added.

(5) The information processing apparatus according to any one of (1) to (3) described above, wherein the topic estimating unit estimates the topic on the basis of a plurality of indexes including a term frequency and an inverse document frequency.

(6) The information processing apparatus according to any one of (1) to (3) described above, wherein the topic estimating unit estimates the topic by assigning weights to words that match or are similar to trending tags on an SNS.

(7) The information processing apparatus according to any one of (1) to (6) described above, wherein the region evaluating unit determines a candidate region having a strong relationship with the topic to be a region of interest.

(8) The information processing apparatus according to (7) described above, wherein the region evaluating unit determines a candidate region in which an object relating to the topic is detected to be a region of interest and determines the other candidate regions to be regions of non-interest using an object detector relating to the topic.

(9) The information processing apparatus according to (8) described above, wherein, in a case in which the topic is a person name, the region evaluating unit performs person detection of detecting a person or a face region from the candidate regions and face identification of identifying a person from a face of the detected person.

(10) The information processing apparatus according to (8) described above, wherein, in a case in which the topic is an object name, the region evaluating unit performs detection of objects corresponding to the topic from candidate regions using an object detector relating to the object name.

(11) The information processing apparatus according to (10) described above, wherein, in a case in which the object detector relating to the topic is not prepared in advance, the region evaluating unit collects an image group having tag information relating to the topic and performs detection of objects using an object detector that has performed learning using the image group.

(12) The information processing apparatus according to (11) described above, wherein the region evaluating unit acquires an object detector relating to the topic by performing weakly-supervised learning on the basis of an image group to which a tag that is the same as or similar to the topic is added.

(13) The information processing apparatus according to any one of (1) to (12) described above, wherein the image generating unit generates an image in which only a region of interest remains or an image in which display of a region of non-interest is inhibited.

(14) An information processing method including: a region estimating step of estimating candidate regions of object detection from an image; a topic estimating step of estimating a topic of the image on the basis of text information accompanying the image; a region evaluating step of evaluating the candidate regions estimated in the region estimating step on the basis of relationships with the topic estimated in the topic estimating step; and an image generating step of generating an image on the basis of evaluation results acquired in the region evaluating step.

(15) A computer program described in a computer-readable form causing a computer to function as: a region estimating unit configured to estimate candidate regions of object detection from an image; a topic estimating unit configured to estimate a topic of the image on the basis of text information accompanying the image; a region evaluating unit configured to evaluate the candidate regions estimated by the region estimating unit on the basis of relationships with the topic estimated by the topic estimating unit; and an image generating unit configured to generate an image on the basis of evaluation results acquired by the region evaluating unit.

(16) An information processing apparatus including: an image input unit configured to receive an image; a text information input unit configured to receive text information accompanying the image; an object detecting unit configured to detect objects included in the image; a subject estimating unit configured to estimate a subject of the image on the basis of the image and the text information; and an image processing unit configured to perform image processing on each object detected by the object detecting unit on the basis of the subject estimated by the subject estimating unit.

(17) The information processing apparatus according to (16), wherein the image processing unit performs image processing on each object in accordance with a degree of relation of each object detected by the object detecting unit with the subject.

(18) An information processing method including: an image input step of receiving an image; a text information input step of receiving text information accompanying the image; an object detecting step of detecting objects included in the image; a subject estimating step of estimating a subject of the image on the basis of the image and the text information; and an image processing step of performing image processing on each object detected by the object detecting object on the basis of the subject estimated by the subject estimating unit.

(19) A computer program described in a computer-readable form causing a computer to function as: an image input unit configured to receive an image; a text information input unit configured to receive text information accompanying the image; an object detecting unit configured to detect objects included in the image; a subject estimating unit configured to estimate a subject of the image on the basis of the image and the text information; and an image processing unit configured to perform image processing on each object detected by the object detecting object on the basis of the subject estimated by the subject estimating unit.

REFERENCE SIGNS LIST

100 Information processing apparatus
110 Control unit
120 Display unit
121 Display panel
122 Display interface
123 Touch panel
124 Touch interface
130 Voice processing unit
131 Voice output unit
132 Voice input unit
133 Voice codec
134 Voice output terminal
140 Communication unit
150 Storage unit
160 Imaging unit
170 Sensor unit
200 Image processing system
201 Region estimating unit
202 Topic estimating unit
203 Region evaluating unit
204 Image generating unit
1000 Image processing system
1001 Image input unit
1002 Text information input unit
1003 Object detecting unit
1004 Subject estimating unit
1005 Object evaluating unit
1006 Image processing unit

The invention claimed is:

1. An information processing apparatus, comprising:
at least one processor configured to:
estimate a plurality of candidate regions of object detection from a first image;
estimate a topic of the first image based on text information, wherein the text information accompanies the first image;
evaluate the plurality of candidate regions based on relationships with the topic;
determine, based on a first object detector that relates to the topic, a candidate region of the plurality of candidate regions as a region of interest, and candidate regions of the plurality of candidate regions, other than the candidate region, as regions of non-interest, wherein
the candidate region has a specific relationship with the topic, and
the candidate region is a region in which an object that relates to the topic is detected;
detect, in a case where the topic is an object name, objects corresponding to the topic from the plurality of candidate regions based on a second object detector that relates to the object name;
collect, in a case where the first object detector is not prepared in advance, an image group having tag information that relates to the topic;
detect the objects based on a third object detector, wherein a learning of the third object detector is based on the image group; and
generate a second image based on the detection of the objects.

2. The information processing apparatus according to claim 1, wherein the at least one processor is further configured to
group, based on an algorithm, regions that are similar on a pixel level, for the estimation of the plurality of candidate regions.

3. The information processing apparatus according to claim 1, wherein the at least one processor is further configured to estimate the topic based on words with specific degrees of importance included in the text information.

4. The information processing apparatus according to claim 1, wherein the at least one processor is further configured to estimate the topic based on at least one of words or tags.

5. The information processing apparatus according to claim 1, wherein the at least one processor is further configured to estimate the topic based on a plurality of indexes including a term frequency and an inverse document frequency.

6. The information processing apparatus according to claim 1, wherein the at least one processor is further configured to estimate the topic based on an assignment of weights to words that one of match or are similar to trending tags on social networking services (SNS).

7. The information processing apparatus according to claim 1, wherein the at least one processor is further configured to:
   detect, in a case where the topic is a person name, a person or a face region from the plurality of candidate regions; and
   identify, in the case where the topic is the person name, the person from a face of the detected person.

8. The information processing apparatus according to claim 1, wherein the at least one processor is further configured to:
   execute weakly-supervised learning based on the image group to which a tag that is same as or similar to the topic is added; and
   acquire, based on the execution of the weakly-supervised learning, the first object detector that relates to the topic.

9. The information processing apparatus according to claim 1, wherein the at least one processor is further configured to generate the second image in which one of the region of interest remains, or display of a region of non-interest of the regions of non-interest is inhibited.

10. An information processing method, comprising:
   by at least one processor:
      estimating a plurality of candidate regions of object detection from a first image;
      estimating a topic of the first image based on text information, wherein the text information accompanies the first image;
      evaluating the plurality of candidate regions based on relationships with the topic;
      determining, based on a first object detector that relates to the topic, a candidate region of the plurality of candidate regions as a region of interest, and candidate regions of the plurality of candidate regions, other than the candidate region, as regions of non-interest, wherein
         the candidate region has a specific relationship with the topic, and
         the candidate region is a region in which an object that relates to the topic is detected;
      detecting, in a case where the topic is an object name, objects corresponding to the topic from the plurality of candidate regions based on a second object detector that relates to the object name;
      collecting, in a case where the first object detector is not prepared in advance, an image group having tag information that relates to the topic;
      detecting the objects based on a third object detector, wherein a learning of the third object detector is based on the image group; and
      generating a second image based on the detection of the objects.

11. A non-transitory computer-readable medium having stored thereon computer-executable instructions that, when executed by a processor, cause the processor to execute operations, the operations comprising:
   estimating a plurality of candidate regions of object detection from a first image;
   estimating a topic of the first image based on text information, wherein the text information accompanies the first image;
   evaluating the plurality of candidate regions based on relationships with the topic;
   determining, based on a first object detector that relates to the topic, a candidate region of the plurality of candidate regions as a region of interest, and candidate regions of the plurality of candidate regions, other than the candidate region, as regions of non-interest, wherein
      the candidate region has a specific relationship with the topic, and
      the candidate region is a region in which an object that relates to the topic is detected;
   detecting, in a case where the topic is an object name, objects corresponding to the topic from the plurality of candidate regions based on a second object detector that relates to the object name;
   collecting, in a case where the first object detector is not prepared in advance, an image group having tag information that relates to the topic;
   detecting the objects based on a third object detector, wherein a learning of the third object detector is based on the image group; and
   generating a second image based on the detection of the objects.

12. An information processing apparatus, comprising:
   at least one processor configured to:
      receive a first image;
      receive text information, wherein the text information accompanies the first image;
      detect objects in the first image, wherein a plurality of candidate regions of the objects is detectable from the first image;
      estimate a subject of the first image based on the first image and the text information, wherein the subject corresponds to a topic;
      determine, based on a first object detector that relates to the topic, a candidate region of the plurality of candidate regions as a region of interest, and candidate regions of the plurality of candidate regions, other than the candidate region, as regions of non-interest, wherein
         the candidate region has a specific relationship with the topic, and
         the candidate region is a region in which an object of the objects that relates to the topic is detected;
      detect, in a case where the topic is an object name, specific objects corresponding to the topic from the plurality of candidate regions based on a second object detector that relates to the object name;
      collect, in a case where the first object detector is not prepared in advance, an image group having tag information that relates to the topic;
      detect the specific objects based on a third object detector, wherein a learning of the third object detector is based on the image group;

perform an image processing operation on each object of the specific objects based on the subject; and generate a second image based on the image processing operation.

13. The information processing apparatus according to claim 12, wherein the at least one processor is further configured to perform the image processing operation on each object of the specific objects based on a degree of relation of the each object with the subject.

14. An information processing method, comprising:

by at least one processor:

receiving a first image;

receiving text information accompanying the first image;

detecting objects in the first image, wherein a plurality of candidate regions of the objects is detectable from the first image;

estimating a subject of the first image based on the first image and the text information, wherein the subject corresponds to a topic;

determining, based on a first object detector that relates to the topic, a candidate region of the plurality of candidate regions as a region of interest, and candidate regions of the candidate regions, other than the candidate region, as regions of non-interest, wherein the candidate region has a specific relationship with the topic, and the candidate region is a region in which an object of the objects that relates to the topic is detected;

detecting, in a case where the topic is an object name, specific objects corresponding to the topic from the plurality of candidate regions based on a second object detector that relates to the object name;

collecting, in a case where the first object detector is not prepared in advance, an image group having tag information that relates to the topic;

detecting the specific objects based on a third object detector, wherein a learning of the third object detector is based on the image group;

performing image processing on each object of the specific objects based on the subject; and generating a second image based on the image processing.

15. A non-transitory computer-readable medium having stored thereon computer-executable instructions that, when executed by a processor, cause the processor to execute operations, the operations comprising:

receiving a first image;

receiving text information accompanying the first image;

detecting objects in the first image, wherein a plurality of candidate regions of the objects is detectable from the first image;

estimating a subject of the first image based on the first image and the text information, wherein the subject corresponds to a topic;

determining, based on a first object detector that relates to the topic, a candidate region of the plurality of candidate regions as a region of interest, and candidate regions of the plurality of candidate regions, other than the candidate region, as regions of non-interest, wherein the candidate region has a specific relationship with the topic, and the candidate region is a region in which an object of the objects that relates to the topic is detected;

detecting, in a case where the topic is an object name, specific objects corresponding to the topic from the plurality of candidate regions based on a second object detector that relates to the object name;

collecting, in a case where the first object detector is not prepared in advance, an image group having tag information that relates to the topic;

detecting the specific objects based on a third object detector, wherein a learning of the third object detector is based on the image group;

performing image processing on each object of the specific objects based on the subject; and generating a second image based on the image processing.

* * * * *